United States Patent [19]

Eidler et al.

[11] Patent Number: 5,605,771

[45] Date of Patent: Feb. 25, 1997

[54] COMPONENT DESIGN FOR AN ELECTRIC ENERGY STORING DEVICE

[75] Inventors: Phillip A. Eidler, Muskego; Eric Loppnow, Milwaukee, both of Wis.

[73] Assignee: ZBB Technologies, Inc., Wauwatosa, Wis.

[21] Appl. No.: 547,744

[22] Filed: Oct. 26, 1995

[51] Int. Cl.⁶ .............................. H01M 2/40; H01M 6/46
[52] U.S. Cl. .............................. 429/72; 429/152; 429/210
[58] Field of Search .............................. 429/72, 149–154, 429/178, 210, 34, 38, 39

[56] References Cited

U.S. PATENT DOCUMENTS

| | | | |
|---|---|---|---|
| 4,125,680 | 11/1978 | Shropshire et al. | 429/4 |
| 4,152,825 | 5/1979 | Bruneau | 429/152 X |
| 4,177,552 | 12/1979 | Gordon et al. | 429/152 X |
| 4,346,150 | 8/1982 | Bellows et al. | 429/18 |
| 4,945,019 | 7/1990 | Bowen et al. | 429/72 |
| 5,002,841 | 3/1991 | Belongia et al. | 429/152 X |
| 5,308,718 | 5/1994 | Eidler et al. | 429/152 |

*Primary Examiner*—Anthony Skapars
*Attorney, Agent, or Firm*—Godfrey & Kahn, S.C.

[57] ABSTRACT

An electric energy storing device constructed from uniquely designed components. Each component includes a first nonconductive frame, having an opening and a predetermined perimeter. Mounted, by its peripheral edge, on the first nonconductive frame, is a plastic sheet, having a centrally positioned opening. The plastic sheet may be made from conductive carbon plastic or from nonconductive, ion-permeable plastic. Mounted to the centrally positioned opening of the plastic sheet is a second nonconductive frame. Each of the frames has a weld bead thereon and a plurality of components are welded together to form an operational device. The provision of a second, centrally located weld prevents deformation or defection at the center of the welded components.

11 Claims, 4 Drawing Sheets

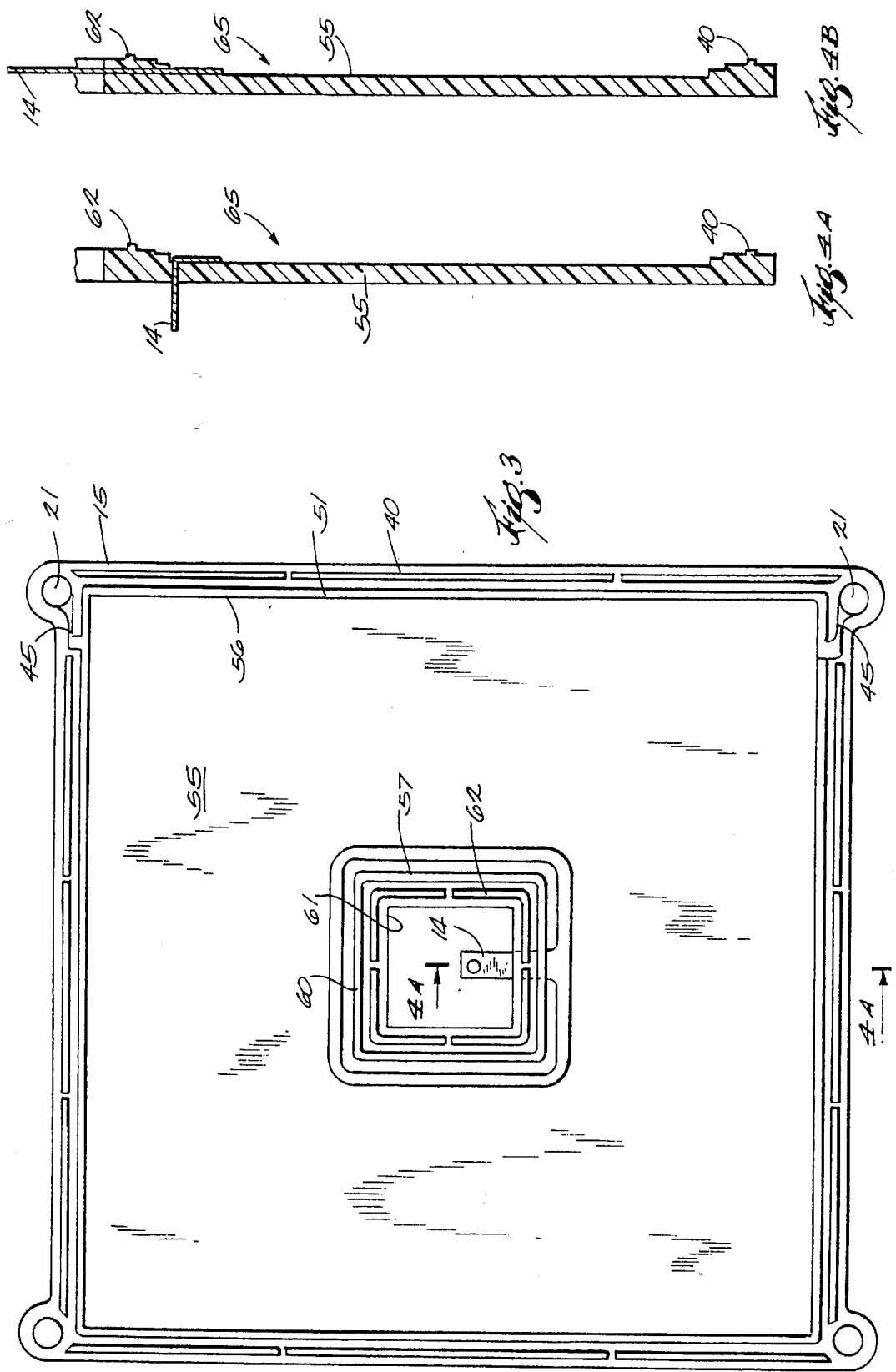

COMPONENT DESIGN FOR AN ELECTRIC ENERGY STORING DEVICE

BACKGROUND OF THE INVENTION

1. Field of the Invention

The present invention relates to electric energy storing devices. More particularly, the present invention relates to a novel, electric-energy-storing-device, component design which may be used to construct, for example, batteries having flowing and non-flowing electrolyte.

2. Description of the Prior Art

Various designs for electric energy storing devices are known in the art. For example, it is known to construct batteries from plastic components. These plastic components include conductive, carbon-plastic sheets; nonconductive, ion-permeable plastic separator sheets; nonconductive plastic frames, and plastic endblocks. The carbon-plastic sheets and ion-permeable plastic separator sheets are welded into the frames. The frames are then vibration welded together such that a series or stack of alternating, frame-mounted, carbon-plastic sheets and separator sheets is formed. An endblock is welded on each end of the stack of frames.

While this construction is an advance over devices formed by bolting together a stack of battery components, it is not completely satisfactory.

One problem with the present design of plastic, electric energy storing devices is component and endblock deflection, or deformation. In an electric energy storing device, such as a bipolar battery or double layer capacitor, it is necessary to maintain the device under compression so that it will operate properly. Present techniques for maintaining compression of the components call for the use of relatively stiff endblocks, with and without stiffening plates. While stiff endblocks help to ensure uniform compression of the battery components, it is possible that the components of the battery may deflect or deform under the pressure maintained in an electric energy storing device. So, for example, the frame mounted, carbon-plastic sheets in the device may bow or deform. They deform in such a manner as to increase the gap between adjacent components in the energy storing device. Of course, the maintenance of a uniform gap between adjacent device components is important to the efficient operation of an electric energy storing device. Present electric-energy-storing-device design, including the use of stiff endblocks, decreases deflection, but is unsuitable because the endblock used are relatively robust, and heavy. Such heavy components are particularly undesirable because of the additional weight they add to electric energy storing devices.

Accordingly, it would be desirable to have an electric energy storing device of improved design which did not require the use of heavy, robust endblocks. In addition, it would be desirable to have an electric energy device of improved design so as to reduce component and endblock deflection even further than present techniques.

OBJECTS AND SUMMARY OF THE INVENTION

Therefore, it is an object of the present invention to provide an electric energy storing device which does not require relatively heavy, robust endblocks.

A further object of the present invention is to provide an electric energy storing device which is constructed so as to reduce endblock and component deflection.

These and other objects and advantages are achieved in an electric energy storing device of the present invention which includes various subcomponents which are assembled to form an operational device. The device of the present invention includes a plurality of first nonconductive frames, each having an opening and a predetermined perimeter. Individually mounted, by each of their peripheral edges, on a predetermined number of the plurality of first nonconductive frames is a plurality of conductive, carbon-plastic sheets, each having a centrally positioned opening. Individually mounted, by each of their peripheral edges, on a predetermined number of the plurality of first nonconductive frames is a plurality of nonconductive, ion-permeable plastic sheets, each having a centrally positioned opening.

In an operational device, conductive, carbon-plastic sheets are individually mounted in about one half of the plurality of first nonconductive plastic frames, and nonconductive, ion-permeable plastic sheets are individually mounted in the remainder of the first nonconductive frames.

The individually frame-mounted, ion-permeable plastic sheets are arranged in alternating, sandwich relation to the individually frame-mounted, carbon plastic sheets.

An electric energy storing device of the present invention also includes a plurality of second nonconductive frames, each having an opening and a predetermined perimeter which is less than the perimeter of each of the first nonconductive frames. A predetermined number of the second nonconductive frames are mounted on the centrally positioned opening of the conductive carbon plastic sheets, and another predetermined number of the second nonconductive frames are mounted on the centrally positioned opening of the nonconductive, ion-permeable plastic sheets.

The frame-mounted subcomponents, i.e., the carbon-plastic and ion-permeable sheets, are welded together to from a stack of cells. The stack of cells may be filled with an electrolyte or be coupled to appropriate electrolyte reservoirs in order to have electrolyte flow through the stack. The carbon-plastic sheets act as bipolar electrodes. In the case where the electric energy storing device desired is a battery, the carbon-plastic sheets provide a surface upon which a chemical reaction takes place. If a capacitor is desired, the carbon plastic sheets provide a surface upon which a charge layer is formed. The ion-permeable sheets act as separators, dividing adjacent cells from one another.

In one embodiment, a device of the present invention is constructed from components with features designed to facilitate the construction of a non-flowing electrolyte battery. Each of the components in such a battery include a first nonconductive frame having an opening and a predetermined perimeter; and a plastic sheet having a peripheral edge and a centrally positioned opening. The peripheral edge of the plastic sheet is mounted on the first frame. The component also includes a second nonconductive frame having an opening and a predetermined perimeter which is less than the perimeter of the first frame. The second nonconductive frame is mounted on the centrally positioned opening of the plastic sheet. In the preferred embodiment, the second nonconductive frame is positioned in coaxial relationship to the first frame.

The first nonconductive frame further includes a first peripheral edge having an electrolyte orifice and an electrolyte flow channel, and a second peripheral edge having an electrolyte orifice and an electrolyte flow channel. The first nonconductive frame may further include a reservoir opening coupled to the electrolyte orifice of the first peripheral edge. The reservoir opening has an electrolyte outlet.

So that additional electrolyte may be stored within the battery, the first nonconductive frame may include a second reservoir opening positioned in its first peripheral edge. The second reservoir opening includes an electrolyte outlet.

As should be apparent, electrodes and separators may be constructed from the components described above. In order to construct an electrode, a sheet of conductive, carbon plastic is mounted to the first and second nonconductive frames. In order to construct a separator, a sheet of nonconductive, ion-permeable plastic is mounted to the first and second nonconductive frames.

Further objects and advantages of the present invention will become more apparent from the following detailed description of the preferred embodiment taken in combination with the accompanying drawings.

BRIEF DESCRIPTION OF THE DRAWINGS

FIG. 3 is a side elevation view of a component of the present invention and, in particular, shows a component designed to function as a terminal electrode in an electric energy storing device.

FIG. 4A is a cross-sectional view taken generally along line 4—4 of the component in FIG. 3 and shows an option for mounting an electric terminal to a terminal electrode.

FIG. 4B is a cross-sectional view taken generally along line 4—4 of the component in FIG. 3 and shows another option for mounting an electric terminal to a terminal electrode.

DETAILED DESCRIPTION

Figure 1:
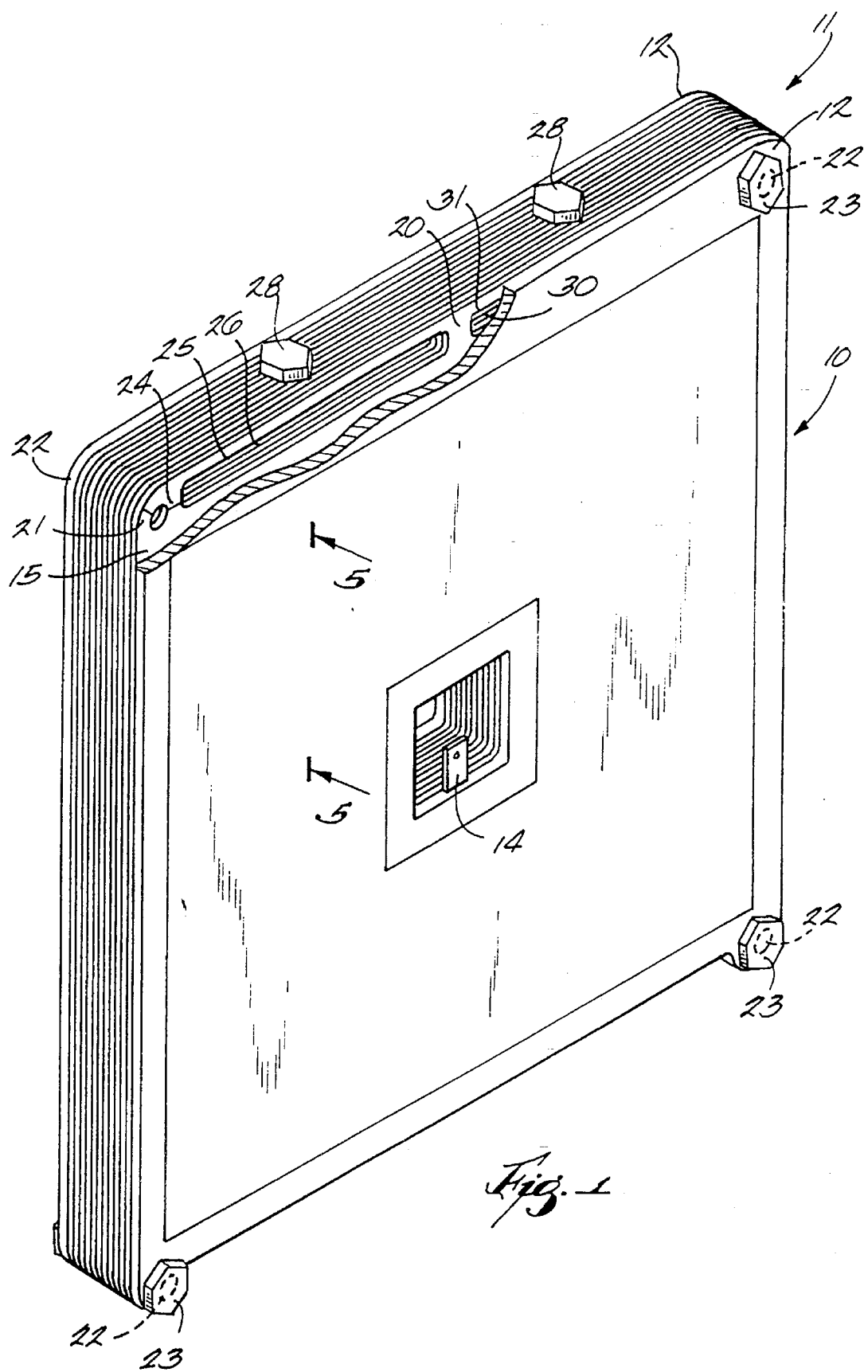
FIG. 1 is a left, perspective, partially cut-away view of an electric energy storing device made in accordance with the teachings of the present invention.

Referring more particularly to the drawings, a multi-cell electric energy storing device in the form of a non-flowing electrolyte battery is designated generally by the numeral 10 in FIG. 1. While for purposes of discussion a battery is described in detail, it should be understood that the construction of the present invention may be used in a variety of different flow and non-flow batteries and other electric energy storing devices, such as capacitors.

The battery 10 includes a series of components, electrodes and separators (each of which is discussed below), welded together to form a stack 11 of electrochemical cells. Each battery 10 includes a predetermined number of electrodes and separators and, thus, a predetermined-number of electrochemical cells. Respective endblocks 12 are disposed at each end of the stack of cells of battery 10. Though shown for only one, each of the endblocks 12 has an opening which provides access to an electric terminal 14. Each electric terminal 14 is coupled to a terminal electrode, which will be discussed further hereinafter. The electric terminals 14 provide a convenient means through which current may enter and leave the battery and to which electric loads and electric voltage or current sources may be coupled.

The battery 10 includes a plurality of first nonconductive plastic frames 15. Each frame 15 has a peripheral edge 20. In the embodiment shown in FIG. 1, the peripheral edge 20 of each of the frames 15 includes an electrolyte orifice 21 at each of its corners. When several frames 15 are welded together the orifices 21 of each frame form ports 22 (at each corner) for filling the battery 10 with electrolyte. The ports 22 formed by the orifices 21 are plugged by caps 23. In addition to creating a fill port, each orifice 21 aids in the positioning of the frames 15 during assembly of the battery 10 (which is described below).

Connected to one of the orifices 21 through a channel 24 is a reservoir opening 25. When several frames are welded together the openings form a first electrolyte reservoir 26. The reservoir 26 may have a vent (not shown) capped with a cover 28. The battery 10 may include a second reservoir 30, formed in the same manner as the first reservoir 26. Each frame 15 may include a second reservoir opening 31, and when several frames are welded together, the second reservoir 30 is created. The second reservoir 30 may be coupled to a second channel (not shown), and a second orifice (not shown). Further, the second reservoir 30 may include a vent (not shown) capped by another cover 28.

The first and second reservoirs 26 and 30 provide an electrolyte capacity beyond that existing in the battery cells. The additional electrolyte capacity provided by the reservoirs permits overfilling of the battery 10 with electrolyte. This, in turn, ensures that all of the electrode surface in the battery 10 is submersed in electrolyte.

Figure 2:
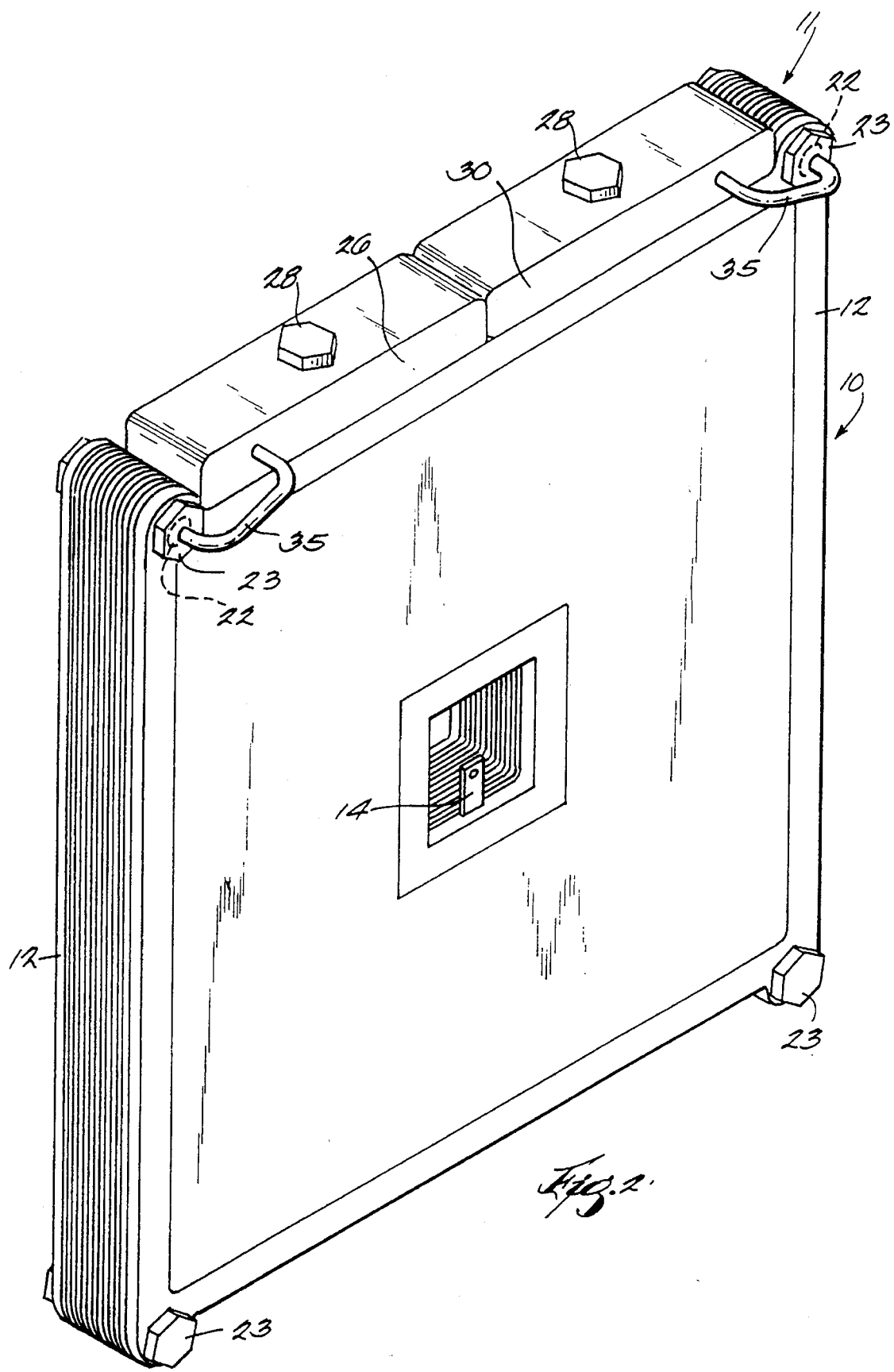
FIG. 2 is a left, perspective view of another electric energy storing device made in accordance with the teachings of the present invention.

Another embodiment of a battery constructed in accordance with the teachings of the present invention is shown in FIG. 2. In FIG. 2, the reservoirs 26 and 30 are positioned outside of each of the frames 15. Plumbing 35 connects the reservoirs to the ports 22. While FIGS. 1 and 2 depict batteries with two reservoirs it should be understood that only one may be necessary.

As seen in FIGS. 1 and 2, an electric energy storage device of the present invention incorporates a design having a means for holding the center of the device together. As best seen in FIG. 3, the design is based upon components constructed from one of the plurality of first nonconductive frames 15. Each of the first nonconductive frames 15 has a predetermined perimeter and includes weld beads 40 around its peripheral edge.

The nonconductive frame shown in FIG. 3 has two electrolyte flow channels 45, each of which is connected to an orifice 21. The flow channels 21 provide a means through which electrolyte may flow in order to fill each cell in an electric energy storing device. These flow channels may be connected to the reservoirs discussed above. The frame 15 has a peripheral edge 50 defining an opening 51.

Mounted within the opening 51 is a plastic sheet 55. The plastic sheet 55 has a square, washer-like shape, a peripheral edge 56, and a centrally positioned opening 57. The peripheral edge 56 of the plastic sheet 55 is mounted on the peripheral edge 50.

A second nonconductive frame 60, having an opening 61 and a predetermined perimeter which is less than the perimeter of the first frame, is mounted within the centrally positioned opening 57 of the plastic sheet 55. The second nonconductive frame 60 includes weld beads 62. In the preferred embodiment, the second nonconductive frame is positioned in coaxial relationship to the first nonconductive frame.

Electrodes and separators for use in a functioning electric energy storing device are both of the construction described above, differing only in the material used for the plastic sheet 55. In an electrode, the plastic sheet is a sheet of conductive, carbon plastic. To create a separator, the plastic sheet 55 is a sheet of nonconductive, ion-permeable plastic. Suitable carbon-plastic and ion-permeable materials suitable for use as electrodes and separators, respectively, are known to those skilled in the art. Suitable carbon plastic electrodes and seperators are shown, for example, in U.S. Pat. No. 4,125,680, which is incorprated by reference herein.

As noted previously, the battery 10 includes terminal electrodes. The battery component depicted in FIGS. 4A and 4B is a terminal electrode 65. As shown in FIG. 4A and 4B, the electric terminal 14 may be mounted to the terminal electrode 65 in a variety of ways.

Figure 5:
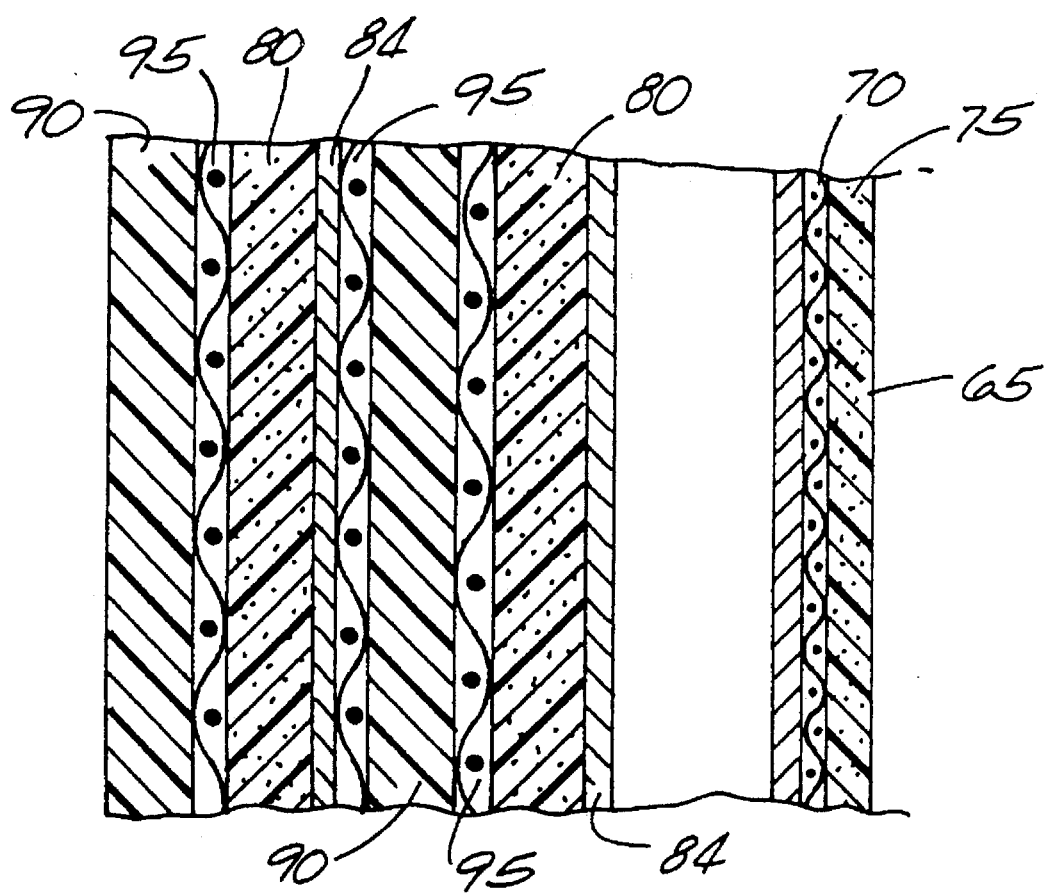
FIG. 5 is an enlarged, schematic, cross-sectional view taken along the line 5—5 of the electric energy storing device of FIG. 1 and shows the multi-layer construction of the device.

In the preferred embodimnent, the electric terminal 14 of each terminal electrode 65 is electrically coupled to a metal screen or mesh 70 which is shown in FIG. 5 and is embedded in a sheet of carbon plastic 75. The terminal electrodes 65 are each a current collector means capable of collecting current from, and distributing current to, the electrochemical cells of the battery. Although not shown, it should be understood that terminal electrodes 65 are mounted on, or adjacent to, each endblock 12.

Operation

As seen by reference to FIG. 5, an operational electric energy device includes a plurality of electrodes 80. Each electrode 80 includes a plastic sheet 55 made from carbon plastic, a nonconductive frame 15, and a nonconductive frame 60. The electrodes 80 may have a carbon coating 84 on one or more of their surfaces. Spaced apart, in alternating, sandwich relation, from the electrodes 80 are a plurality of separators 90. Each separator includes a plastic sheet 55 made of ion-permeable material, a nonconductive frame 15, and a nonconductive frame 60. The gap between adjacent separators 90 and electrodes 80 is maintained by a spacer material, which may take the form of a polymeric mesh 95. In a functioning device the frame mounted components are welded or otherwise connected together to form a sealed unit capable of holding a liquid.

An electric energy device-of the present invention may be constructed using thermal welding techniques. The method employed to construct, for example, the battery 10 is similar to the method of constructing a battery which is disclosed in U.S. Pat. No. 4,945,019, the specification of which is incorporated by reference herein. In particular, the welding process involves placing adjacent components to be welded together into a welding machine (not shown). Placement may be facilitated by matching the orifices 21 to pegs on the fixtures on the welding machine.

Typically, the first weld is accomplished by placing an endblock in the lower fixture of a welding machine and placing a terminal electrode in the upper fixture of the machine. The lower fixture moves along a predetermined course of travel until physical contact is made between the two components. Vibration of a predetermined magnitude is imparted to the objects and a weld is achieved thereby.

The process continues when the component in the upper fixture, which during the first weld is the terminal electrode, is disengaged and the lower fixture moves in a direction away from the newly welded component. Another component is then secured to the top fixture and the process is repeated. When the desired number of components are welded to the stack, which is located on the bottom fixture, an endblock is placed in the upper fixture and welded to the end of the stack to complete the process. Thus, the components of the battery 10 are welded together to form a fluid impervious and substantially leak-proof case. The components are welded in an alternating fashion, wherein alternate layers of electrodes and separators make up the stack of cells.

One key feature of the present invention is that the adjacent components are welded at two points, first along the weld beads of each of the first nonconductive frames 15, and second along the weld beads of each of the second nonconductive frames 60. By providing a second weld bead at the center of the components that make up an electric energy storing device, each component is held together more strongly at its center, where the greatest deflection in the device will occur.

While the present invention has been described in what is believed to be the most preferred-forms, others are possible. For example, while the battery 10 is shown having a single-window design, where a single component is mounted within a frame, it is possible that the frame 15 could have two, three, or more openings in which plastic sheets 55 could be mounted. Accordingly, an electric energy device having side-by-side cells or having layered cells, one on top of the other, could be built. In addition, the frames described herein could be of various geometric shapes other than the shapes depicted in the drawings. Thus, it is to be understood that the invention is not confined to the particular construction and arrangement of the components herein illustrated and described, but embraces such modified forms thereof as come within the scope of the following claims.

What is claimed is:

1. A component for an electric energy storing device, the component comprising:
   a first nonconductive frame having an opening and a perimeter;
   a plastic sheet having a peripheral edge and an opening, the peripheral edge of the plastic sheet mounted on the first frame; and
   a second nonconductive frame having an opening and a perimeter which is less than the perimeter of the first frame and mounted on the opening of the plastic sheet.

2. A component for an electric energy storing device as claimed in claim 1, and wherein the second nonconductive frame is positioned in coaxial relationship to the first frame.

3. A component for an electric energy storing device as claimed in claim 1, and wherein the first nonconductive frame further includes a first peripheral edge having an electrolyte orifice and an electrolyte flow channel, and a second peripheral edge having an electrolyte orifice and an electrolyte flow channel.

4. A component for an electric energy storing device as claimed in claim 3, and wherein the first nonconductive frame further includes a reservoir opening coupled to the electrolyte orifice of the first peripheral edge and having an electrolyte outlet.

5. A component for an electric energy storing device as claimed in claim 4, and wherein the first nonconductive frame further includes a second reservoir opening positioned in the first peripheral edge of the first nonconductive frame and having an electrolyte outlet.

6. A component for an electric energy storing device as claimed in claim 1, and wherein the plastic sheet is a sheet of conductive, carbon plastic.

7. A component for an electric energy storing device as claimed in claim 1, and wherein the plastic sheet is a sheet of nonconductive, ion-permeable plastic.

8. An electric energy storing device comprising:

a plurality of first nonconductive frames, each having an opening and a perimeter;

a plurality of conductive, carbon-plastic sheets, each having a peripheral edge and a centrally positioned opening, the peripheral edge of each conductive, carbon-plastic sheet mounted on a first number of the plurality of first nonconductive frames;

a plurality of nonconductive, ion-permeable plastic sheets, each having a peripheral edge and a centrally positioned opening, the peripheral edge of each nonconductive, ion-permeable plastic sheet mounted on a second number of the plurality of first nonconductive frames;

a plurality of second nonconductive frames, each having an opening and a perimeter which is less than the perimeter of each of the first nonconductive frames, a first number of the second nonconductive frames mounted on the centrally positioned opening of the conductive, carbon-plastic sheets, and a second number of the second nonconductive frames mounted on the centrally positioned opening of the nonconductive, ion-permeable plastic sheets;

wherein the individual frame-mounted, nonconductive, ion-permeable sheets are arranged in alternating, sandwich relation to the individual frame-mounted, carbon-plastic sheets.

9. A component for an electric energy storing device, the component comprising:

a first nonconductive frame having an opening, a perimeter, and at least one electrolyte flow channel;

a plastic sheet having a peripheral edge and an opening, the peripheral edge of the plastic sheet mounted on the first frame; and a second nonconductive frame having an opening and a perimeter which is less than the perimeter of the first frame and mounted on the opening of the plastic sheet.

10. A component for an electric energy storing device as claimed in claim 9, and wherein the plastic sheet is a sheet of conductive, carbon plastic.

11. A component for an electric energy storing device as claimed in claim 9, and wherein the plastic sheet is a sheet of nonconductive, ion-permeable plastic.

* * * * *